United States Patent
Leslie (10) Patent No.: US 12,476,988 B2
(45) Date of Patent: Nov. 18, 2025

(54) IN-VEHICLE NETWORK INTRUSION DETECTION USING UNSUPERVISED LEARNING

(71) Applicant: Nightwing Group, LLC, Dulles, VA (US)

(72) Inventor: Nandi O. Leslie, Silver Spring, MD (US)

(73) Assignee: NIGHTWING GROUP, LLC, New York, NY (US)

( * ) Notice: Subject to any disclaimer, the term of this patent is extended or adjusted under 35 U.S.C. 154(b) by 208 days.

(21) Appl. No.: 17/516,101

(22) Filed: Nov. 1, 2021

(65) Prior Publication Data
US 2022/0182402 A1 Jun. 9, 2022

Related U.S. Application Data

(60) Provisional application No. 63/122,277, filed on Dec. 7, 2020.

(51) Int. Cl.
*G06F 21/00* (2013.01)
*G06F 18/231* (2023.01)
(Continued)

(52) U.S. Cl.
CPC ........ *H04L 63/1425* (2013.01); *G06F 18/231* (2023.01); *H04L 12/40071* (2013.01);
(Continued)

(58) Field of Classification Search
CPC ........... H04L 63/1425; H04L 12/40071; H04L 2012/40215; H04L 67/12; G06F 18/231; G06N 20/20
See application file for complete search history.

(56) References Cited

U.S. PATENT DOCUMENTS

| | | | |
|---|---|---|---|
| 2016/0234167 A1* | 8/2016 | Engel | H04L 63/1408 |
| 2018/0198812 A1* | 7/2018 | Christodorescu | H04L 63/1425 |
| 2020/0314117 A1* | 10/2020 | Nguyen | H04L 63/145 |

FOREIGN PATENT DOCUMENTS

| | | | | |
|---|---|---|---|---|
| CN | 108809946 A | * | 11/2018 | ........... H04L 63/145 |
| CN | 108881277 A | * | 11/2018 | ......... H04L 63/1416 |
| CN | 109344913 A | * | 2/2019 | ........... G06K 9/6218 |

OTHER PUBLICATIONS

L. Su et al, "Hierarchical Clustering Based Network Traffic Data Reduction for Improving Suspicious Flow Detection," 2018 17th IEEE International Conference On Trust, Security And Privacy In Computing And Communications, pp. 744-753, doi: 10.1109/TrustCom/BigDataSE.2018.00108. (Year: 2018).*

(Continued)

*Primary Examiner* — Kevin Ayala
(74) *Attorney, Agent, or Firm* — Cowan, Liebowitz & Latman, P.C.; Mark Montague (57) ABSTRACT

Discussed herein are devices, systems, and methods for detecting anomalous or malicious processes based on in-vehicle network traffic data. A method includes receiving, at a monitor device, a controller access network (CAN) bus packet from an electronic control unit (ECU), implementing an ensemble hierarchical agglomerative clustering (E-HAC) algorithm to identify respective clusters to which the CAN bus data maps, and determining, based on the identified respective clusters, whether the CAN bus packet is associated with in-vehicle network intrusion.

22 Claims, 5 Drawing Sheets

(51) Int. Cl.
H04L 9/40 (2022.01)
H04L 12/40 (2006.01)
(52) U.S. Cl.
CPC ............... *H04L 2012/40215* (2013.01); *H04L 2012/40273* (2013.01)

(56) References Cited

OTHER PUBLICATIONS

U. Ezeobi, H. Olufowobi, C. Young, J. Zambreno and G. Bloom, "Reverse Engineering Controller Area Network Messages Using Unsupervised Machine Learning," in IEEE Consumer Electronics Magazine, vol. 11, No. 1, pp. 50-56, doi: 10.1109/MCE.2020. 3023538. (Year: 2020).*
E. Hooper, "An Intelligent Intrusion Detection and Response System Using Hybrid Ward Hierarchical Clustering Analysis," 2007 International Conference on Multimedia and Ubiquitous Engineering (MUE'07), Seoul, Korea (South), 2007, pp. 1187-1192, doi: 10.1109/MUE.2007.80. (Year: 2007).*
G. D'Angelo, A. Castiglione and F. Palmieri, "A Cluster-Based Multidimensional Approach for Detecting Attacks on Connected Vehicles," in IEEE Internet of Things Journal, vol. 8, No. 16, pp. 12518-12527, 15 Aug. 15, 2021, doi: 10.1109/JIOT.2020.3032935. (Year: 2020).*
Akbari, E., Dahlan, H., Ibrahim, R., Alizadeh, H. "Hierarchical Cluster Ensemble Selection", Elsevier, Engineering Applications of Artificial Intelligence, vol. 39, pp. 146-156, 2015. (Year: 2015).*
Xue, M., Bian R., Liu, W., Wang, J. "Defeating Untrustworthy Testing Parties: A Novel Hybrid Clustering Ensemble Based Golden Models-Free Hardware Trojan Detection Method," in IEEE Access, vol. 7, pp. 5124-5140, 2019 (Year: 2019).*
Chiu, C. H., Chen, J. J., Yu, F. "An Effective Distributed GHSOM Algorithm for Unsupervised Clustering on Big Data". 2017 IEEE 6th International Congress on Big Data. 2017. (Year: 2017).*
Makrehchi, M. "Hierarchical Agglomerative Clustering Using Common Neighbors Similarity". 2016 IEEE/WIC/ACM International Conference on Web Intelligence. 2016. (Year: 2016).*
D'Angelo, G., Castiglione, A., Palmieri, F. "A Cluster-Based Multidimensional Approach for Detecting Attacks on Connected Vehicles". Oct. 22, 2020. IEEE. doi: 10.1109/JIOT.2020.3032935 (Year: 2020).*
Emmendorfer, L. R. "An Empirical Evaluation of Two Novel Linkage Criteria for Hierarchical Agglomerative Clustering". Oct. 15-18, 2019. IEEE. doi: 10.1109/BRACIS.2019.00114 (Year: 2019).*
Park, S., Choi, J. Y. "Hierarchical Anomaly Detection Model for In-Vehicle Networks Using Machine Learning Algorithms". Jul. 15, 2020. PubMed. doi: 10.3390/s20143934. (Year: 2020).*
Avatefipour, O., Al-Sumaiti, A. S., El-Sherbeeny, A. M., Awwad, E. M., Elmeligy, M. A., Mohamed, M. A. "An Intelligent Secured Framework for Cyberattack Detection in Electric Vehicles' CAN Bus Using Machine Learning". Aug. 26, 2019. IEEE. doi: 10.1109/ ACCESS.2019.2937576 (Year: 2019).*
Faridi, H., Srinivasagopalan, S., Verma, R. "Performance Evaluation of Features and Clustering Algorithms for Malware". Nov. 17-20, 2018. IEEE. doi: 10.1109/ICDMW.2018.00010 (Year: 2018).*
Levi, M., Allouche, Y., Kontorovich, A. "Advanced Analytics for Connected Car Cybersecurity". Jun. 3-6, 2018. IEEE. doi: 10.1109/ VTCSpring.2018.8417690 (Year: 2018).*
Hassan, S. Z., Verma, B. "Decisions Fusion Strategy: Towards Hybrid Cluster Ensemble". Dec. 3-6, 2007. IEEE. doi: 10.1109/ ISSNIP.2007.4496873 (Year: 2007).*

\* cited by examiner

IN-VEHICLE NETWORK INTRUSION DETECTION USING UNSUPERVISED LEARNING

RELATED APPLICATION

This application claims the benefit of priority to U.S. Provisional Patent Application No. 63/122,277 titled "Intra-Vehicular Network Intrusion Detection Using Unsupervised Learning" and filed on Dec. 7, 2020, which is incorporated herein by reference in its entirety.

GOVERNMENT RIGHTS

This invention was made with United States government support under contract W911QX-18-D-0002. The government has certain rights in the invention.

TECHNICAL FIELD

Embodiments discussed herein regard devices, systems, and methods for securing in-vehicle communication networks.

BACKGROUND

In recent years, intrusion detection systems (IDS) for in-vehicle networks have gained some attention, and there are several surveys that present research challenges and propose computational modeling methods and algorithms for IDS (Al-Jarrah et al., 2018; Lokman et al., 2019; Young et al., 2019). There are many machine learning methods applied to anomaly-based IDS for in-vehicle networks in these surveys (e.g., K-means clustering, neural networks).

Young et al. (2020) suggest a system that applies a hierarchical agglomerative clustering (HAC)-based algorithm using a Euclidean metric as a reverse engineering technique to understand the precise meaning of controller area network (CAN) messages (e.g., braking, driving, shifting, windows and door locks). This approach is limited to using the Euclidean metric for one linkage function which is unspecified in Young; and Young examines the meaning of CAN messages, such as whether the vehicle is driving or braking rather than detecting malicious CAN traffic (Young et al., 2020).

DETAILED DESCRIPTION

In-vehicle networks remain largely unprotected from a myriad of vulnerabilities to failures caused by adversarial activities. Embodiments illustrate how remote attacks on an in-vehicle network can lead to detectable changes in the perceived physical characteristics of the vehicle. CAN bus traffic provides vehicle behavior information that can be used for attack detection. The Society of Automotive Engineering (SAE) J1939 protocol for the CAN bus is designed for and used in heavy-duty ground vehicles. Embodiments can include an ensemble HAC (E-HAC) algorithm described in more detail below to monitor the behavior within the CAN bus traffic and detect attacks (e.g., spoofing, denial of service) to this network. On J1939 data, the E-HAC algorithm of embodiments has state-of-the-art performance for intrusion detection.

Embodiments are distinct from the papers cited in the Background in that embodiments implement a novel E-HAC algorithm derived from HAC approaches in unsupervised machine learning. Further, the E-HAC algorithm of embodiments detect malicious CAN traffic as opposed to solely determining physical action of the vehicle based on CAN messages.

Embodiments provide a first known application of the E-HAC algorithm to CAN bus traffic for intrusion detection. The modeling approach differs from the approach in Young et al. (2020) in that embodiments can implement an ensemble learning method across multiple HAC algorithms with multiple linkage functions and metrics considered (e.g., Euclidean, $L^1$, $L^2$, cosine metrics).

Using unsupervised and ensemble learning approaches, embodiments provide a novel anomaly detection algorithm for IDS that monitors CAN bus traffic and detects cyberattacks for which there are no signatures. For experimental results, datasets comprised of over 20,000 CAN bus J1939 data of normal and malicious traffic (e.g., an injection attack of spoofed engine speed messages inserted dynamically into the benign traffic). The normal traffic is from a public dataset from the University of Tulsa, and US Army Combat Capabilities Development Command Army Research Laboratory generated the CAN bus attack data with spoofed engine rotations per minute (RPM).

Embodiments can pre-process the CAN bus data packets by converting the categorical features to numerical features, such as with a one-hot encoding algorithm. Embodiments can then perform feature normalization such that the features have zero mean and unit standard deviation. Subsequently, embodiments can reduce feature space dimensionality with Principal Component Analysis (PCA), while maintaining over 99% accuracy over the variability with the remaining principal components.

Embodiments develop a novel E-HAC algorithm using multiple linkage functions to measure distance between clusters and various distance metrics used to compute the linkage. A HAC algorithm is an unsupervised learning algorithm that assumes a bottom-up approach to clustering a set of observations N. Each observation is initially in a single cluster, and the N clusters are recursively merged such that at the next step, there are N–1 mutually exclusive clusters, where 2 clusters are merged of the possible N(N–1)/2 pairs that maximize the objective function, given the linkage criteria selected for grouping. This clustering is repeated until some predefined fixed number (an integer greater than or equal to one) of clusters remain.

Embodiments can consider 4 dissimilarities to find the distance between any two clusters, G and H: single, complete, group average, and Ward. The intergroup dissimilarity, or diameter for the single linkage HAC, is a nearest neighbor technique for determining, which is the closest pair of clusters, $$d(G, H) = \min_{\substack{i \in G \\ j \in H}} d_{ij} \quad (1)$$

where $d_{ij}$ is the metric to determine the pairwise distance between observations for $i \in G$ and $j \in H$. Embodiments consider a plurality of metrics, $d_{ij}$: Euclidean (also commonly referred to as $L^2$), $L^1$, and cosine distances. The complete linkage in Equation (2) takes the largest dissimilarity (or furthest distance) between two clusters $$d(G, H) = \max_{\substack{i \in G \\ j \in H}} d_{ij}, \quad (2)$$

and the group average linkage dissimilarity is defined in Equation (3) by $$d(G, H) = \frac{1}{N_G N_H} \sum_{i \in G} \sum_{j \in H} d_{ij}, \quad (3)$$

where $N_G$ and $N_H$ are the number of observations in clusters, G and H. Given a feature space $X = \{x_1, \ldots, x_N\}$ of observations $x_k \in \mathbb{R}^P$ for $k=1, \ldots, N$ and $p \geq 1$, the dissimilarity for the Ward linkage is given by Equation (4)

$$d(G,H) = \Sigma_{x_k \in G \cup H} \|x_k - \mu_{G \cup H}\|^2, \quad (4)$$

where $\mu$ is the centroid of the new cluster merged from G and H.

Subsequently, embodiments can use an ensemble learning algorithm in which the plurality of distance metrics (e.g., single linkage HAC with $L^1$) of each clustering of the HAC algorithms are examined to predict whether the data packet is normal or anomalous/malicious (e.g., where a tie can be broken in favor of a malicious packet prediction). This model for detecting CAN bus attacks is referred to as the E-HAC algorithm. Specifically, given a feature space X of observations $X_k \in \mathbb{R}^P$ for $k=1, \ldots, N$, $p \geq 1$, and B hierarchical clustering models $f^b$, the prediction of the majority vote can be taken as $$f(x_k) = \mathrm{mode}\{f^1(x_k), f^2(x_k), \ldots, f^B(x_k)\} \quad (5)$$

Table 1 shows that the E-HAC algorithm performs with high accuracy, where true positive rate (TPR) (also referred to as recall) is 1.0 and false positive rate (FPR) of 0.0 for the CAN bus dataset, including both normal and cyberattack data. Although recall is 1.0 for E-HAC, it has substantially higher error rates (e.g., FPR) and lower precision, when each HAC is applied individually with an unsupervised learning approach without the ensemble learning algorithm.

TABLE 1

PREDICTION PERFORMANCE RESULTS, PRECISION, RECALL, AND FPR FOR INDIVIDUAL HAC AND E-HAC ALGORITHMS WITH LINKAGE AND AFFINITY (DISTANCE).

| HAC ALGORITHM - LINKAGE, DISTANCE | PRECISION | RECALL | FALSE POSITIVE RATE |
|---|---|---|---|
| WARD, $L^2$ | 1.00 | 1.00 | 0 |
| COMPLETE, $L^2$ | 0.46 | 1.00 | 0.92 |
| COMPLETE, $L^1$ | 0.46 | 1.00 | 0.92 |
| COMPLETE, COSINE | 1.00 | 1.00 | 0 |
| AVERAGE, $L^2$ | 0 | 0 | 0.08 |
| AVERAGE, $L^1$ | 0 | 0 | 0.08 |
| AVERAGE, COSINE | 1.00 | 1.00 | 0 |
| SINGLE, $L^2$ | 1.00 | 1.00 | 0 |
| SINGLE, $L^1$ | 1.00 | 1.00 | 0 |
| SINGLE, COSINE | 1.00 | 1.00 | 0 |
| ENSEMBLE | 1.00 | 1.00 | 0 |

The following aspects of the anomaly-based IDS algorithm for CAN bus cyberattacks are example advantages of embodiments:
  i. A HAC algorithm from unsupervised learning for CAN bus intrusion detection. Embodiments use a majority vote across predictions from multiple HAC algorithms, where appropriate combinations of multiple linkages—Ward, single, average, and complete—and affinities—Euclidean, $L^1$, and cosine—are implemented and examined.
  ii. Embodiments provide an application of the E-HAC algorithm to anomaly-based intrusion detection for within-vehicle network traffic, such as can include CAN bus J1939 data, where the malicious traffic are spoofed messages on the engine speed or other vehicle characteristic.
  iii. Embodiments provide an evaluation of prediction results, precision, recall, and FPR, for within-vehicle network attack detection, E-HAC algorithm.

Embodiments will now be described with reference to the FIGS.

Figure 1:
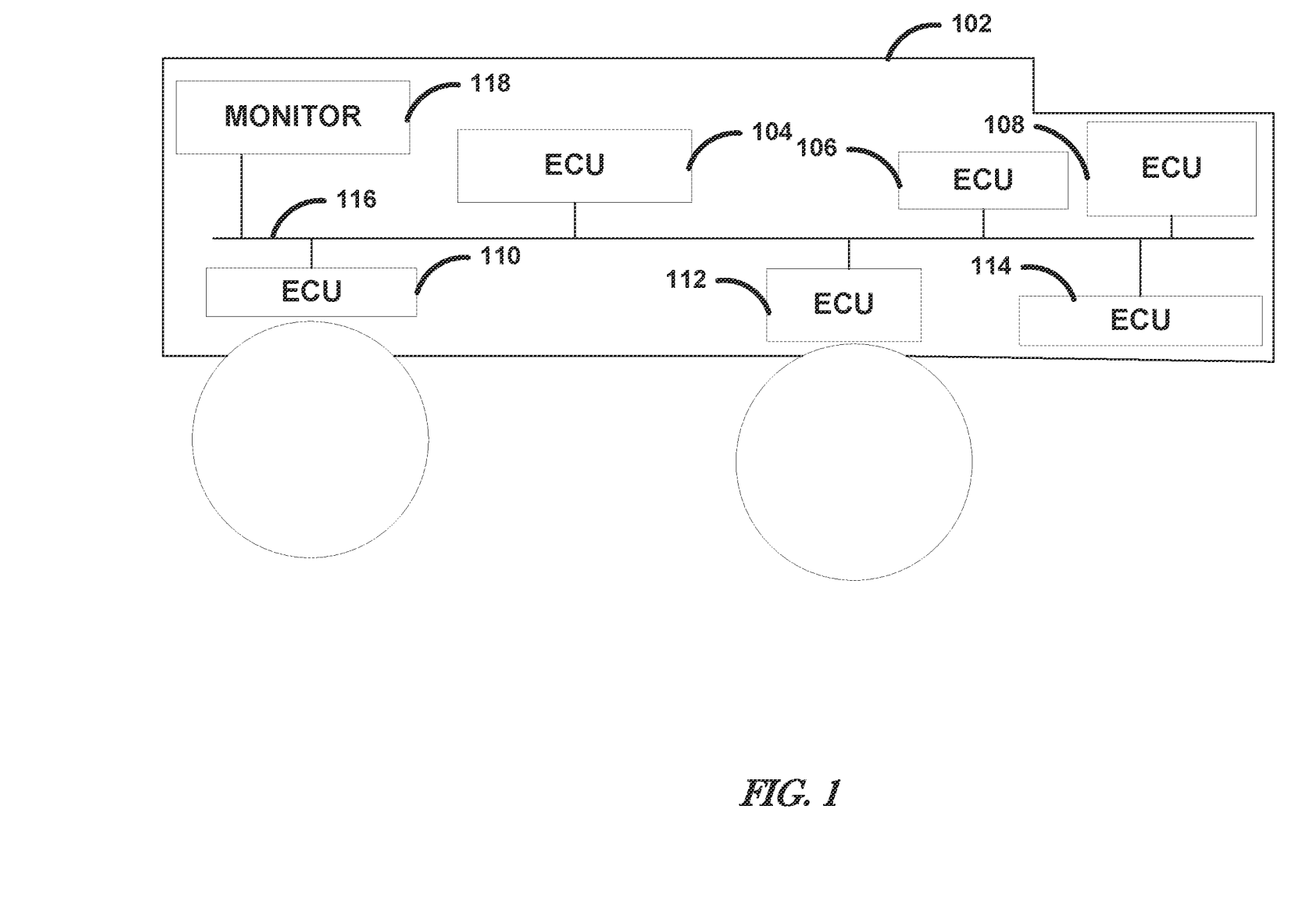
FIG. 1 illustrates, by way of example, a block diagram of an embodiment of a vehicle with a CAN.

FIG. 1 illustrates, by way of example, a block diagram of an embodiment of a vehicle 102 with a CAN bus. A CAN bus includes a plurality of electronic control units (ECUs) coupled to a CAN bus 116. The CAN bus 116 provides a medium through which each ECU 104, 106, 108, 110, 112, 114 can communicate a data packet to other ECUs. The ECU 104, 106, 108, 110, 112, 114 can control a subsystem of the vehicle 102. Example ECU controlled subsystems include engine control, braking system, transmission, climate control, suspension, lighting, locks, or the like.

A CAN data packet includes a start of frame bit, an identifier (11 bits or extended to 29 bits for J1939 for example), a remote transmission request bit, control bits, data, an error detecting code (e.g., a cyclic redundancy check), acknowledgement bits, and end of frame (EOF) bits. The CAN data can include a torque control message from the transmission to the engine, vehicle road speed (odometer reading), engine RPM, gas efficiency, coolant temperature, engine oil level, oil pressure, fuel level, handbrake applied, distance to service, fuel consumption per unit distance or time, tire pressure, coolant level, or the like, among others.

CAN does not support any security features intrinsically. There is also no encryption in standard CAN implementations, which leaves CAN open to man-in-the-middle frame interception. In most implementations, applications are expected to deploy their own security mechanisms (e.g., to authenticate incoming commands or the presence of certain devices on the CAN). Failure to implement adequate security measures may result in various sorts of attacks if the opponent manages to insert messages on the bus. While passwords exist for some safety-critical functions, such as modifying firmware, programming keys, or controlling antilock brake actuators, these systems are not implemented universally and have a limited number of seed/key pairs.

To help provide security for such vulnerabilities, embodiments include a monitor that receives the CAN data packets over the bus 116, analyzes the CAN data packets, and determines whether the CAN data packets are related to anomalous or benign behavior. The monitor 118 can be implemented using software, hardware, firmware, or combination thereof. The monitor 118 can include electric or electronic components organized, electrically coupled, or otherwise configured to perform operations of the monitor 118. The electric or electronic components can include one or more transistors, resistors, capacitors, diodes, inductors, switches, oscillators, logic gates (AND, OR, XOR, negate, buffer, or the like), multiplexers, amplifiers, power supplies, memory devices, processor devices [e.g., central processing units (CPUs), graphics processing units (GPUs), field programmable gate arrays, application specific integrated circuits], power supplies, analog to digital converters, digital to analog converters, regulators, converters, inverters, or the like. The monitor 118 can perform the operations of method 200 of FIG. 2.

Figure 2:
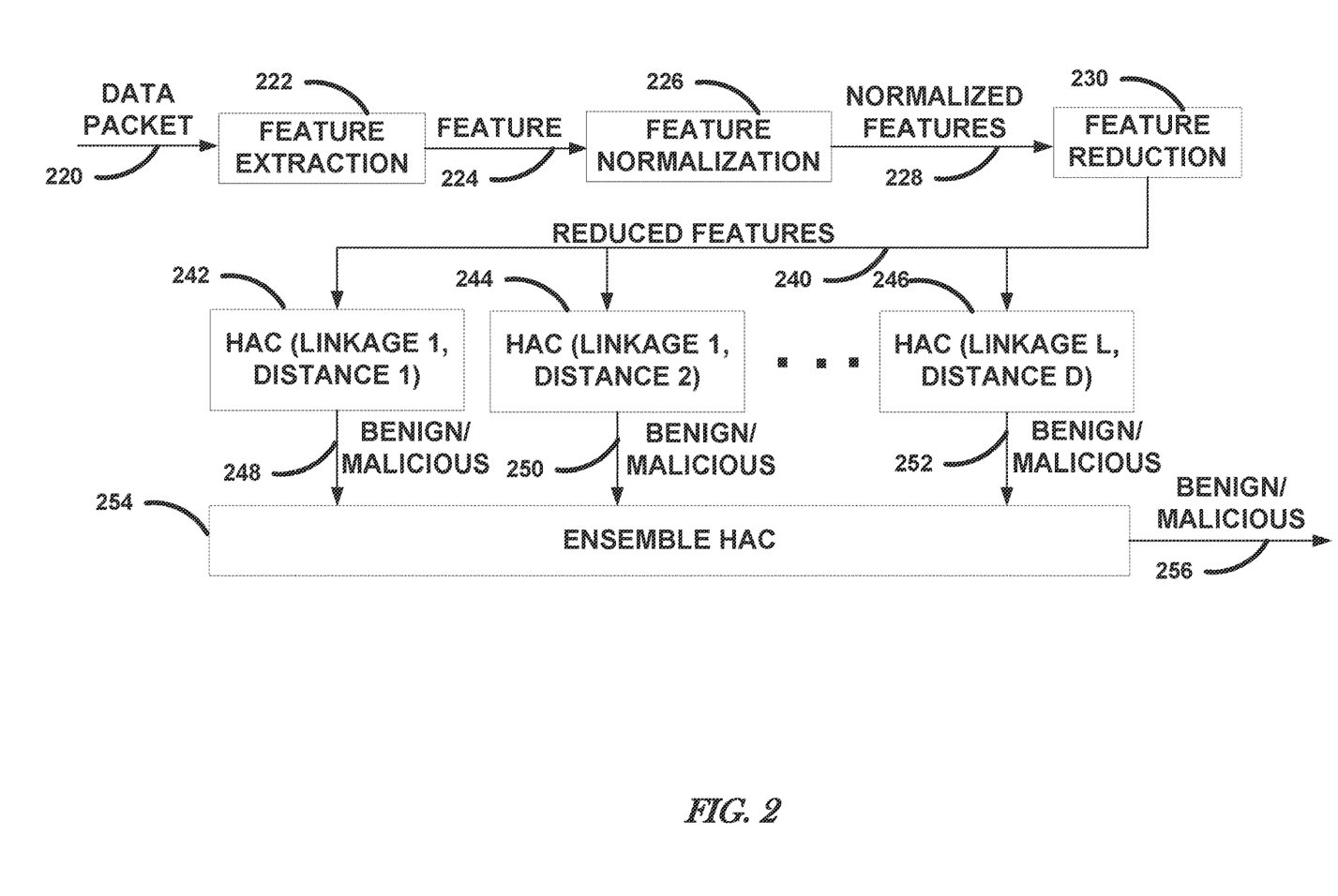
FIG. 2 illustrates, by way of example, a flow diagram of an embodiment of a modeling method for anomaly detection in an in-vehicle network.

FIG. 2 illustrates, by way of example, a flow diagram of an embodiment of a method 200 for anomaly detection in an in-vehicle network. The method 200 as illustrated includes receiving an in-vehicle data packet 220. The in-vehicle data packet 220 can include a CAN packet, using the J1939 protocol. Feature extraction can be performed at operation 222. The operation 222 can include identifying information in the data packet 220 that can be relevant to a determination of whether the data packet is malicious or benign. The extracted features can include a vehicle condition, such as vehicle speed, engine torque, engine RPM, vehicle acceleration, or other data provided by the ECU 104, 106, 108, 110, 112, 114. The operation 222 produces features 224. The features 224 are numeric values that represent the state of the condition being monitored by the ECU 104, 106, 108, 110, 112, 114.

The features 224 can be normalized at operation 226. Feature normalization maps feature values in a first range to feature values in a different, second range. The second range can be [0, 1] or other range. The operation 226 results in a normalized feature 228. At operation 230, the features can be reduced. There are various techniques for feature dimensionality reduction in the feature space including PCA, independent component analysis, linear discriminant analysis, among others. Dimensionality reduction can reduce training time, can help avoid overfitting, can aid data visualization, compress the data, and can even transform non-linear data to linearly separable data.

The result of dimensionality reduction is reduced features 240. The reduce features 240 can be input to a plurality of HAC algorithms 242, 244, 246. The number of HAC techniques 242, 244, 246 is variable and can be an integer number greater than one (1). Each of the HAC techniques 242, 244, 246 can be based on different linkage functions and pairwise distances. A linkage function determines the distance between clusters or sets of observations as a function of pairwise distances between observations. Example linkage functions include Ward, complete (sometimes called maximum), average (weighted or unweighted average), single (sometimes called minimum), minimum energy, centroid, or the like. A metric or pairwise distance between observations can include $L^1$, Euclidean ($L^2$), squared Euclidean, cosine, Manhattan, maximum, Mahalanobis, Hamming, among others. Ultimately, the linkage and pairwise distance can alter how each observation is clustered.

A HAC algorithm (sometimes called "HAC technique") is a "bottom-up" up approach to clustering in which each observation starts in its own cluster and pairs of clusters are merged based on the linkage functions and metrics. Assume there are N observations (data packets 220 in the context of this application). Each of the N observations is assigned its own cluster in feature space. The linkage (which uses the specified distance in its function) can be determined and used to cluster two of the N observations. The clusters that contain the closest pair of elements not yet belonging to the same cluster according to the linkage can be clustered into a single cluster. After the first clustering operations, there are N−1 clusters, after the second clustering operation, there are N−2 clusters, and so on. The HAC technique 242, 244, 246 can be iterated until there are a specified number of clusters. The clusters in this context represent as many normal operation (benign) clusters as desired and as many malicious clusters as desired. For example, if the number of clusters is two (2), the first cluster represents normal behavior and the second cluster represents malicious behavior. Thus, when the reduced features 240 of the next data packet 220 are determined to be closer to the first cluster, the data packet 220 is considered normal and when the reduced features 240 of the next data packet 220 are determined to be closer to the second cluster, the data packet 220 is considered malicious. If there are more than two clusters, the third cluster can represent an additional type of malicious or benign behavior.

The different HAC algorithms 242, 244, 246 can each produce a respective prediction 248, 250, 252 as to whether the data packet 220 is malicious or benign based on the cluster to which the data packet 220 is mapped. The operation 254 can generate an output 256 indicating whether the data packet 220 is benign or malicious using the E-HAC algorithm and based on the predictions 248, 250, 252. The E-HAC algorithm can determine which prediction is the most popular among all of the HAC techniques 242, 244, 246. In case of a tie, the operation 254 can indicate that the data packet 220 is malicious or a specific type of malicious if there are multiple malicious clusters in the final clustering provided by the HAC technique 242, 244, 246.

Figure 3:
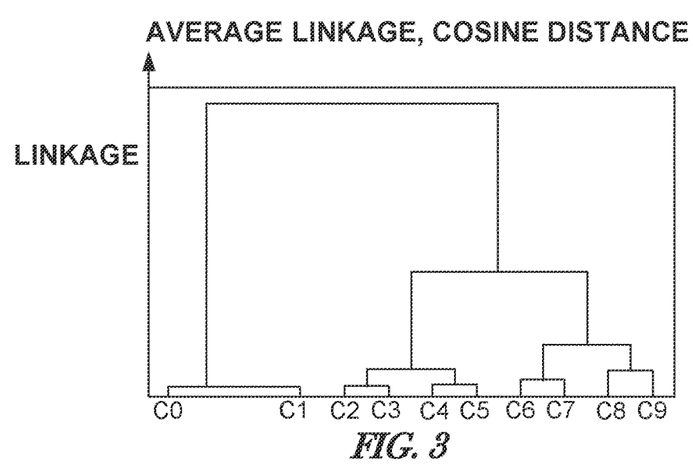
FIGS. 3, 4, and 5 illustrate respective dendrograms of different HAC algorithms resulting from same data packet.
Figure 4:
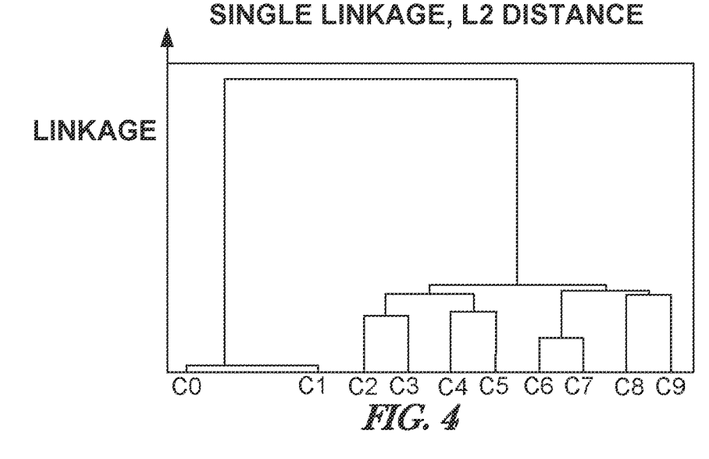
Figure 5:
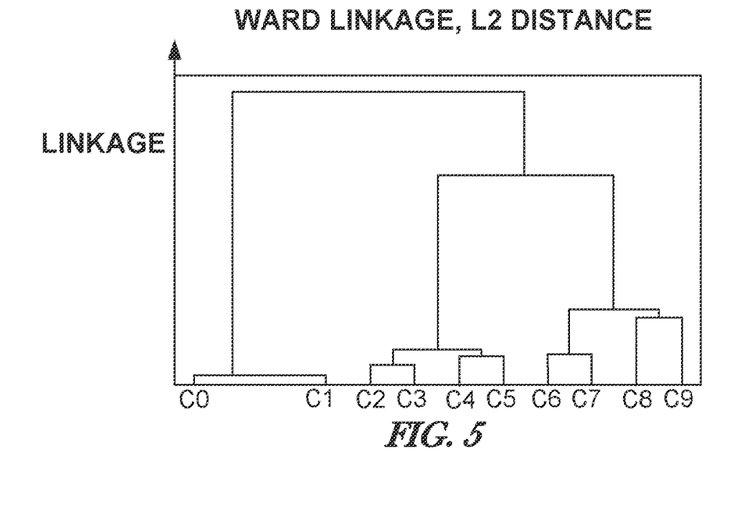

FIGS. 3, 4, and 5 illustrate respective dendrograms of different HAC techniques 242, 244, 246 resulting from same data packets 220. The y-axis represents the pairwise distance between observations (i.e., CAN bus data) with the data packets 220 (C0, C1, C2, C3, C4, C5, C6, C7, C8, C9) along the x-axis. Visually, the dendrograms for the 3 HAC algorithms are quite similar, and these models have accurate prediction performance metrics (see Table 1). The dendrogram of FIG. 3 is for average linkage and cosine distance. The dendrogram of FIG. 4 is for single linkage and $L^2$ distance. The dendrogram of FIG. 5 is for Ward linkage and $L^2$ distance. Other linkage functions and pairwise distance combinations can generate different dendrograms and clusters.

Figure 6:
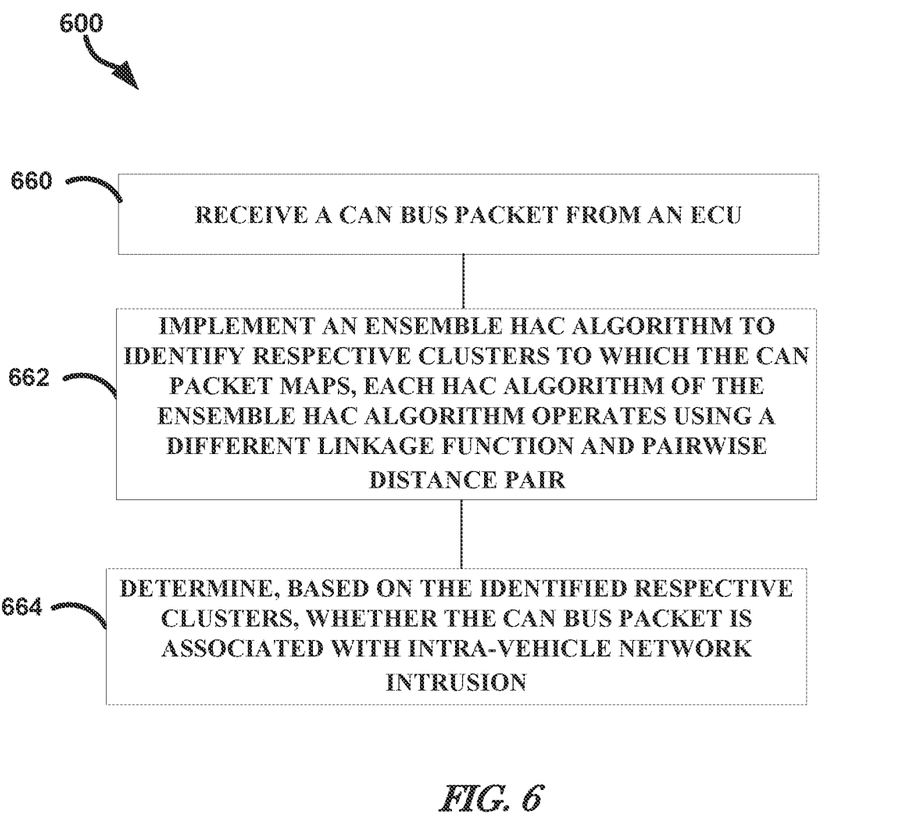
FIG. 6 illustrates, by way of example, a block diagram of an embodiment of a modeling methodology for in-vehicle network intrusion detection.

FIG. 6 illustrates, by way of example, a block diagram of an embodiment of a method 600 for in-vehicle network intrusion detection. The method 600 as illustrated includes, receiving a CAN bus packet from an ECU, at operation 660; implementing the E-HAC algorithm to identify respective clusters to which the CAN bus data maps, each HAC algorithm of the E-HAC algorithm operates using different linkage function and distance pairs, at operation 662; and determining, based on the identified respective clusters, whether the CAN bus data is associated with in-vehicle network intrusion, at operation 664.

The operation 664 can further include using the E-HAC algorithm that determines the CAN bus packet is a network intrusion if a majority of the identified respective clusters to which the CAN bus packet maps are associated with malicious behavior and benign if not. The linkage functions can include two or more of Ward, average, simple, or complete. The pairwise distances can include two or more of $L^1$, $L^2$, or cosine.

The CAN bus data can conform to the J1939 protocol. The method 600 can further include extracting features of the CAN bus packet. The HAC algorithms can operate on the extracted features to cluster the CAN bus packet. The extracted features can include two or more of engine RPM, vehicle speed, coolant temperature, engine oil level, oil pressure, fuel level, handbrake applied, distance to service, fuel consumption per unit distance or time, or coolant level.

Figure 7:
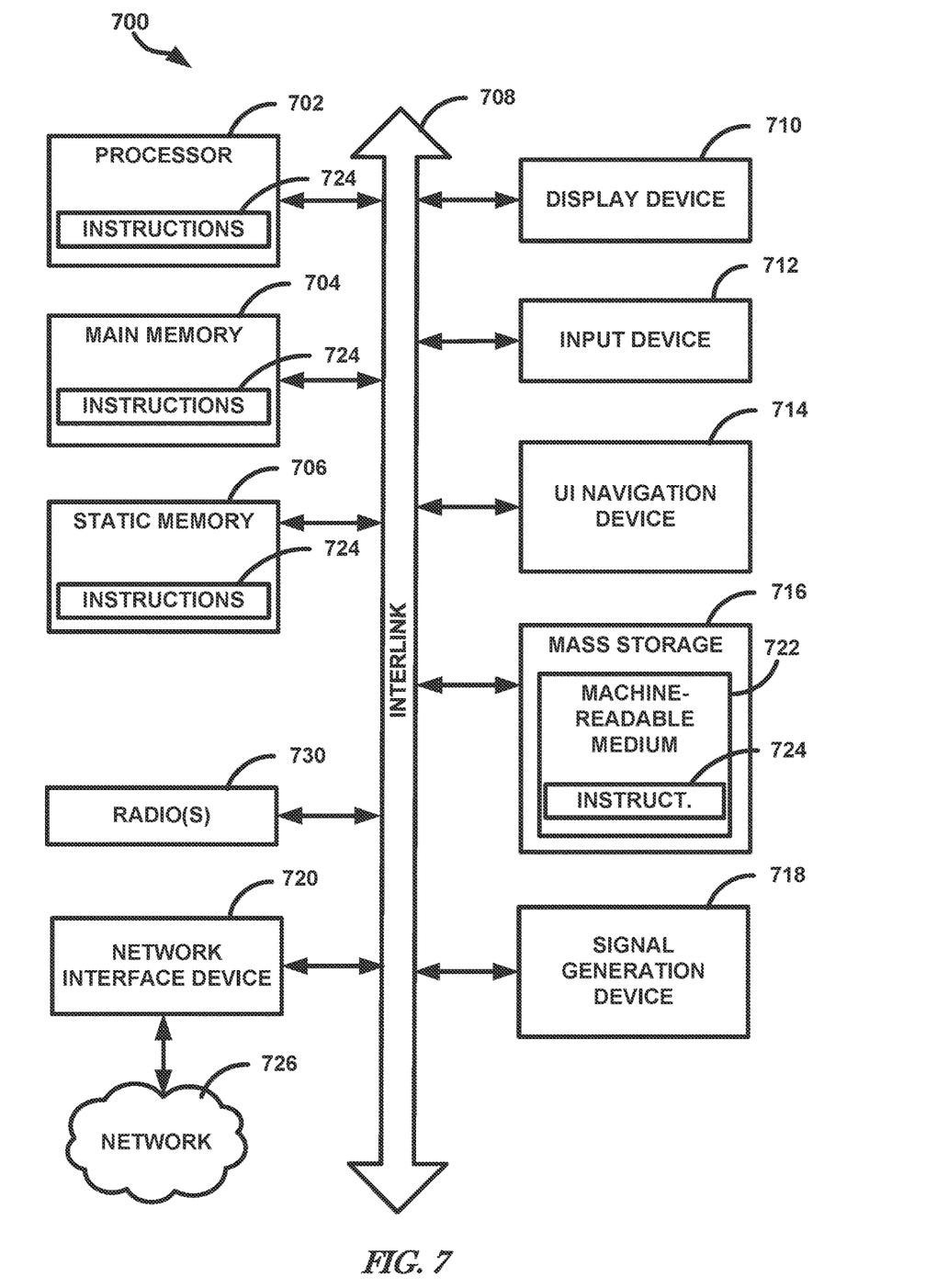
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., CPU, GPU), a main memory 704 and a static memory 706, which communicate with each other via a bus 708. The computer system 700 may further include a video display unit 710 (e.g., liquid crystal display, cathode ray tube). The computer system 700 also includes an alphanumeric input device 712 (e.g., keyboard), a user interface navigation device 714 (e.g., mouse), a mass storage unit 716, a signal generation device 718 (e.g., speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMAX networks). The term "transmission medium" shall be taken to include any intangible medium that is capable of storing, encoding, or carrying instructions for execution by the machine, and includes digital or analog communications signals or other intangible media to facilitate communication of such software.

Additional Notes and Examples

Example 1 includes a device of an in-vehicle network, the device comprising at least one memory including instructions stored thereon, and processing circuitry configured to execute the instructions, the instructions, when executed, cause the processing circuitry to perform operations comprising receiving a CAN bus packet from an electronic control unit (ECU), implementing the E-HAC algorithm to identify respective clusters to which the CAN bus packet maps, each HAC algorithm of the E-HAC algorithm operates using different linkage function and distance pairs, and determining, based on the identified respective clusters, whether the CAN bus packet is associated with a cyberattack.

In Example 2, Example 1 can further include, wherein determining whether the CAN bus packet is associated with the network intrusion includes using the E-HAC algorithm that determines the CAN bus packet is a network intrusion if a majority of the identified respective clusters to which the CAN bus packet maps are associated with malicious behavior and benign if not.

In Example 3, at least one of Examples 1-2 can further include, wherein the linkage functions include two or more of Ward, average, simple, or complete.

In Example 4, at least one of Examples 1-3 can further include, wherein the pairwise distances include two or more of $L^1$, $L^2$, or cosine.

In Example 5, at least one of Examples 1-4 can further include, wherein the CAN bus data conform to the J1939 Standards.

In Example 6, Example 5 can further include, wherein the operations further include extracting features of the CAN bus packet; and wherein the E-HAC algorithm operates on the extracted features to cluster the CAN bus packet.

In Example 7, Example 6 can further include, wherein the features include two or more of engine RPM, vehicle speed, coolant temperature, engine oil level, oil pressure, fuel level, handbrake applied, distance to service, fuel consumption per unit distance or time, or coolant level.

Example 8 can include a non-transitory machine-readable medium including instructions that, when executed by a machine, cause the machine to perform operations for in-vehicle network intrusion detection, the operations comprising receiving a CAN bus packet from an ECU, implementing the E-HAC algorithm to identify respective clusters to which the CAN bus packet maps, each HAC algorithm of the E-HAC algorithm operate using different linkage function and distance pairs, and determining, based on the identified respective clusters, whether the CAN bus packet is associated with in-vehicle network intrusion.

In Example 9, Example 8 can further include, wherein determining whether the CAN bus packet is associated with the in-vehicle network intrusion includes using the E-HAC algorithm that determines the CAN bus packet is a network intrusion if a majority of the identified respective clusters to which the CAN bus packet maps are associated with malicious behavior and benign if not.

In Example 10, at least one of Examples 8-9 can further include, wherein the linkage functions include two or more of Ward, average, simple, or complete.

In Example 11, at least one of Examples 8-10 can further include, wherein the pairwise distances include two or more of $L^1$, $L^2$, or cosine.

In Example 12, at least one of Examples 8-11 can further include, wherein the CAN bus data conform to J1939 Standards.

In Example 13, Example 12 can further include, wherein the operations further comprise extracting features of the CAN bus packet, and wherein the E-HAC algorithm operates on the extracted features to cluster the CAN bus packet.

In Example 14, Example 13 can further include, wherein the features include two or more of engine RPM, vehicle speed, coolant temperature, engine oil level, oil pressure, fuel level, handbrake applied, distance to service, fuel consumption per unit distance or time, or coolant level.

Example 15 includes a method for in-vehicle network intrusion detection, the method comprising receiving, at a monitor device, a CAN bus packet from an ECU, implementing the E-HAC algorithm to identify respective clusters to which the CAN bus packet maps, each HAC algorithm of the E-HAC algorithm operate using different linkage function and distance pairs, and determining, based on the identified respective clusters, whether the CAN bus packet is associated with in-vehicle network intrusion.

In Example 16, Example 15 can further include, wherein determining whether the CAN bus packet is associated with the in-vehicle network intrusion includes using the E-HAC algorithm that determines the CAN bus packet is a network intrusion if a majority of the identified respective clusters to which the CAN bus packet maps are associated with malicious behavior and benign if not.

In Example 17, at least one of Examples 15-16 can further include, wherein the linkage functions include two or more of Ward, average, simple, or complete linkage.

In Example 18, at least one of Examples 15-17 can further include, wherein the pairwise distances include two or more of $L^1$, $L^2$, or cosine.

In Example 19, at least one of Examples 15-18 can further include, wherein the CAN bus data conform to the J1939 protocol.

In Example 20, Example 19 can further include extracting features of the CAN bus packet, and wherein the E-HAC algorithm operates on the extracted features to cluster the CAN bus packet.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device of an in-vehicle network, the device comprising:
   at least one memory including instructions stored thereon; and
   processing circuitry configured to execute the instructions, the instructions, when executed, cause the processing circuitry to perform operations comprising:
   receiving a controller access network (CAN) bus packet from an electronic control unit (ECU);
   implementing an ensemble hierarchical agglomerative clustering (E-HAC) algorithm, the E-HAC algorithm implementing multiple HAC algorithms on the CAN bus packet to identify respective clusters to which the CAN bus packet maps in relationship to other CAN bus packets, wherein each CAN bus packet is treated as a separate observation for each HAC evaluation in the clustering analysis, with at least two different distance measures and at least two different linkage functions used by said HAC the E-HAC, wherein each of said HAC algorithms of the E-HAC algorithm operates using a distinct combination of a linkage function and a distance measure pair within said E-HAC, and wherein each of the respective clusters is associated with a designation of either malicious behavior or benign behavior;
   identifying a mode of the designation of the respective clusters; and
   determining the CAN bus packet that is associated with a network intrusion responsive to identifying the mode of the designation is malicious behavior and the results of the identification of respective clusters using the E-HAC algorithm.

2. The device of claim 1, wherein the E-HAC algorithm determines the CAN bus packet is benign responsive to identifying the mode of the designation is benign behavior.

3. The device of claim 1, wherein the linkage functions include two or more of Ward, average, simple, or complete linkage.

4. The device of claim 1, wherein the distances include two or more of L1, L2, or cosine.

5. The device of claim 1, wherein data of the CAN bus packets conforms to 11939 Standards.

6. The device of claim 5, wherein the operations further comprise: extracting features of the CAN bus packet and
   wherein the HAC algorithms of the E-HAC algorithm operate on the extracted features to cluster the CAN bus packet.

7. The device of claim 6, wherein the features include two or more of engine rotations per minute (RPM), vehicle speed, coolant temperature, engine oil level, oil pressure, fuel level, handbrake applied, distance to service, fuel consumption per unit distance or time, or coolant level.

8. A non-transitory machine-readable medium including instructions that, when executed by a machine, cause the machine to perform operations for in-vehicle network intrusion detection, the operations comprising:
   receiving a controller access network (CAN) bus packet from an electronic control unit (ECU);
   implementing an ensemble hierarchical agglomerative clustering (E-HAC) algorithm, the E-HAC algorithm implementing multiple HAC algorithms on the CAN bus packet to identify respective clusters to which the CAN bus packet maps in relationship to other CAN bus packets, wherein each CAN bus packet is treated as a separate observation for each HAC evaluation in the clustering analysis, with at least two different distance measures and at least two different linkage functions used by said HAC algorithms of the E-HAC, wherein each of said HAC algorithms of the E-HAC algorithm operates using a distinct combination of a linkage function and a distance measure pair within said E-HAC, and wherein each of the respective clusters is associated with a designation of either malicious behavior or benign behavior;
   identifying a mode of the designation of the respective clusters: and
   determining the CAN bus packet that is associated with in-vehicle network intrusion responsive to identifying the mode of the designation is malicious behavior and the results of the identification of respective clusters using the E-HAC algorithm.

9. The non-transitory machine-readable medium of claim 8, wherein the E-HAC algorithm determines the CAN bus packet is benign if responsive to identifying the mode of designation is benign behavior.

10. The non-transitory machine-readable medium of claim 8, wherein the linkage functions include two or more of Ward, average, simple, or complete linkage.

11. The non-transitory machine-readable medium of claim 8, wherein the distances include two or more of L1, L2, or cosine.

12. The non-transitory machine-readable medium of claim 8, wherein data of the CAN bus packet conforms to J1939 Standards.

13. The non-transitory machine-readable medium of claim 12, wherein the operations further comprise:
   extracting features of the CAN bus packet; and
      wherein the HAC algorithms operate on the extracted features to duster the CAN bus packet.

14. The non-transitory machine-readable medium of claim 13, wherein the features include two or more of engine rotations per minute (RPM), vehicle speed, coolant temperature, engine oil level, oil pressure, fuel level, handbrake applied, distance to service, fuel consumption per unit distance or time, or coolant level.

15. A method for in-vehicle network intrusion detection, the method comprising
   receiving, at a monitor device, a controller access network (CAN) bus packet from an electronic control unit (ECU);
   implementing an ensemble hierarchical agglomerative clustering (E-HAC) algorithm, the E-HAC algorithm implementing multiple HAC algorithms on the CAN bus packet to identify respective clusters to which the CAN bus packet maps in relationship to other CAN bus packets, wherein each CAN bus packet is treated as a separate observation for each HAC evaluation in the clustering analysis,
   with at least two different distance measures and at least two different linkage functions used by said HAC algorithms of the E-HAC, wherein each of said HAC algorithms of the E-HAC algorithm operates using a distinct combination of a linkage function and a distance measure pair within said E-HAC, and wherein each of the respective clusters is associated with a designation of either malicious behavior or benign behavior;
   identifying a mode of the designation of the respective clusters; and
   determining the CAN bus packet that is associated with in-vehicle network intrusion responsive to identifying the mode of the designation is malicious behavior and the results of the identification of respective clusters using the E-HAC algorithm.

16. The method of claim 15, wherein determining whether the E-HAC algorithm determines the CAN bus packet is benign responsive to identifying the mode of the designation is benign behavior.

17. The method of claim 15, wherein the linkage functions include two or more of Ward, average, simple, or complete.

18. The method of claim 15, wherein the distances include two or more of L1, L 2, or cosine.

19. The method of claim 15, wherein data of the CAN bus packet conforms to J1939 Standards.

20. The method of claim 19, further comprising: extracting features of the CAN bus packet; and
   wherein the E-HAC algorithm operates on the extracted features to cluster the CAN bus packet.

21. The device of claim 1, wherein the processing circuitry is configured to execute the instructions that cause the processing circuitry to perform converting multiple vehicle characteristics and conditions to a corresponding normalized and dimensionally reduced set of numerical feature values, wherein determining the CAN bus packet is associated with network intrusion includes determining the CAN bus packet is associated with a network intrusion or is not associated with a network intrusion as a function of the number of respective clusters to which the CAN bus packet maps associated with malicious behavior and the number of respective clusters associated with benign behavior, and wherein the CAN bus packet is determined to be associated with an intrusion if a majority of identified respective clusters to which the CAN bus maps is associated with malicious behavior, and the CAN bus packet is determined to be associated with a benign behavior if a majority of identified respective clusters to which the CAN bus maps is associated with benign behavior.

22. The method of claim 15, further comprising converting multiple vehicle characteristics and conditions to a corresponding normalized and dimensionally reduced set of numerical feature values, wherein the determining step includes determining the CAN bus packet is associated with a network intrusion or is not associated with a network intrusion as a function of the number of respective clusters to which the CAN bus packet maps associated with malicious behavior and the number of respective clusters associated with benign behavior, and wherein the CAN bus packet is determined to be an intrusion if a majority of identified respective clusters to which the CAN bus maps is associated with malicious behavior, and the CAN bus packet is determined to be benign if a majority of identified respective clusters to which the CAN bus maps is associated with benign behavior.

* * * * *